Figure 1:
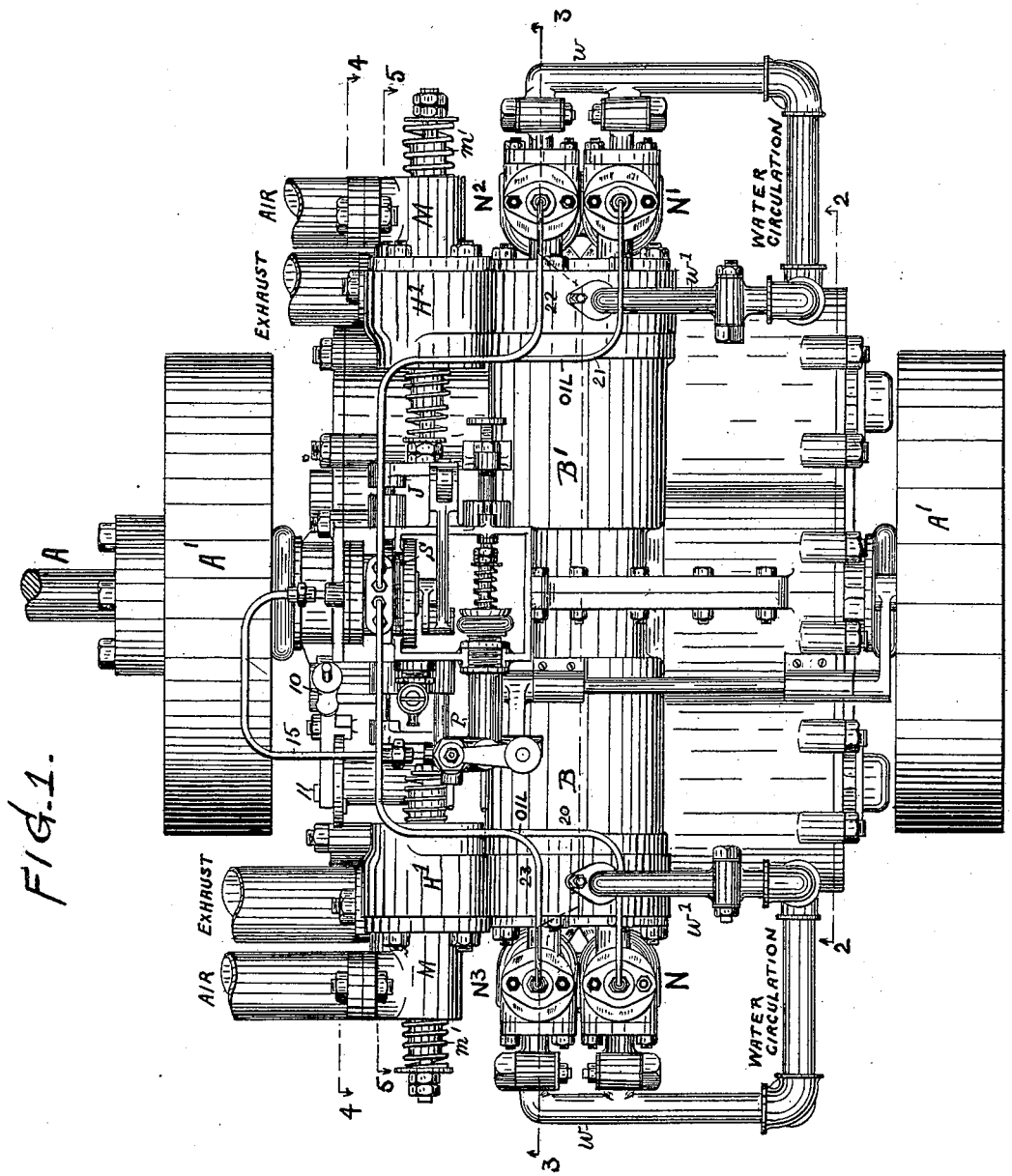

No. 682,003. Patented Sept. 3, 1901.
W. W. TUCK & A. WASSMANN.
EXPLOSION ENGINE.
(Application filed Mar. 5, 1901.)

(No Model.) 8 Sheets—Sheet 1.

WITNESSES:
F. W. Wright
S. C. Connor

INVENTORS
WILLIAM W. TUCK,
AUGUST WASSMANN
BY
Howson and Howson
THEIR ATTORNEYS

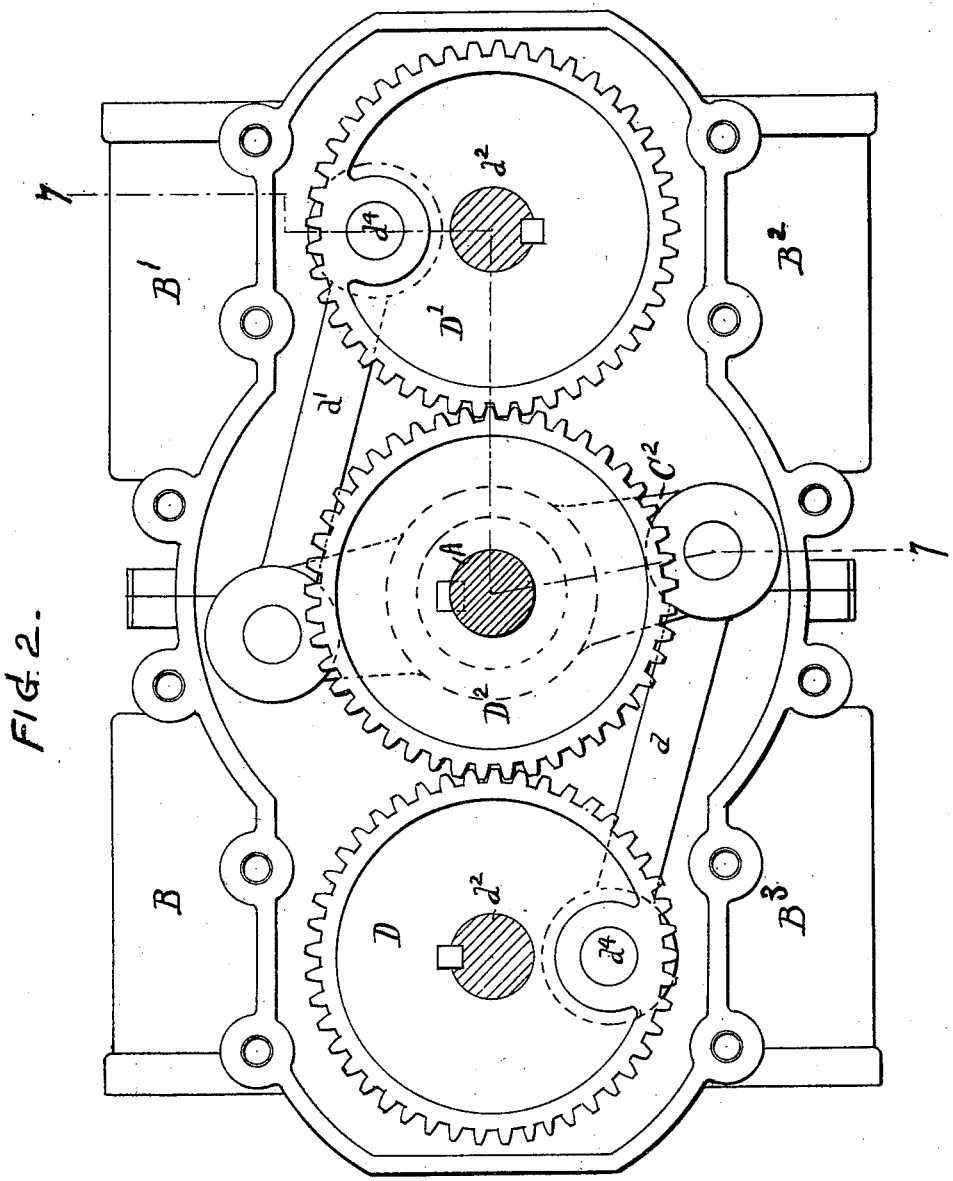

No. 682,003. Patented Sept. 3, 1901.
W. W. TUCK & A. WASSMANN.
EXPLOSION ENGINE.
(Application filed Mar. 5, 1901.)
(No Model.) 8 Sheets—Sheet 3.
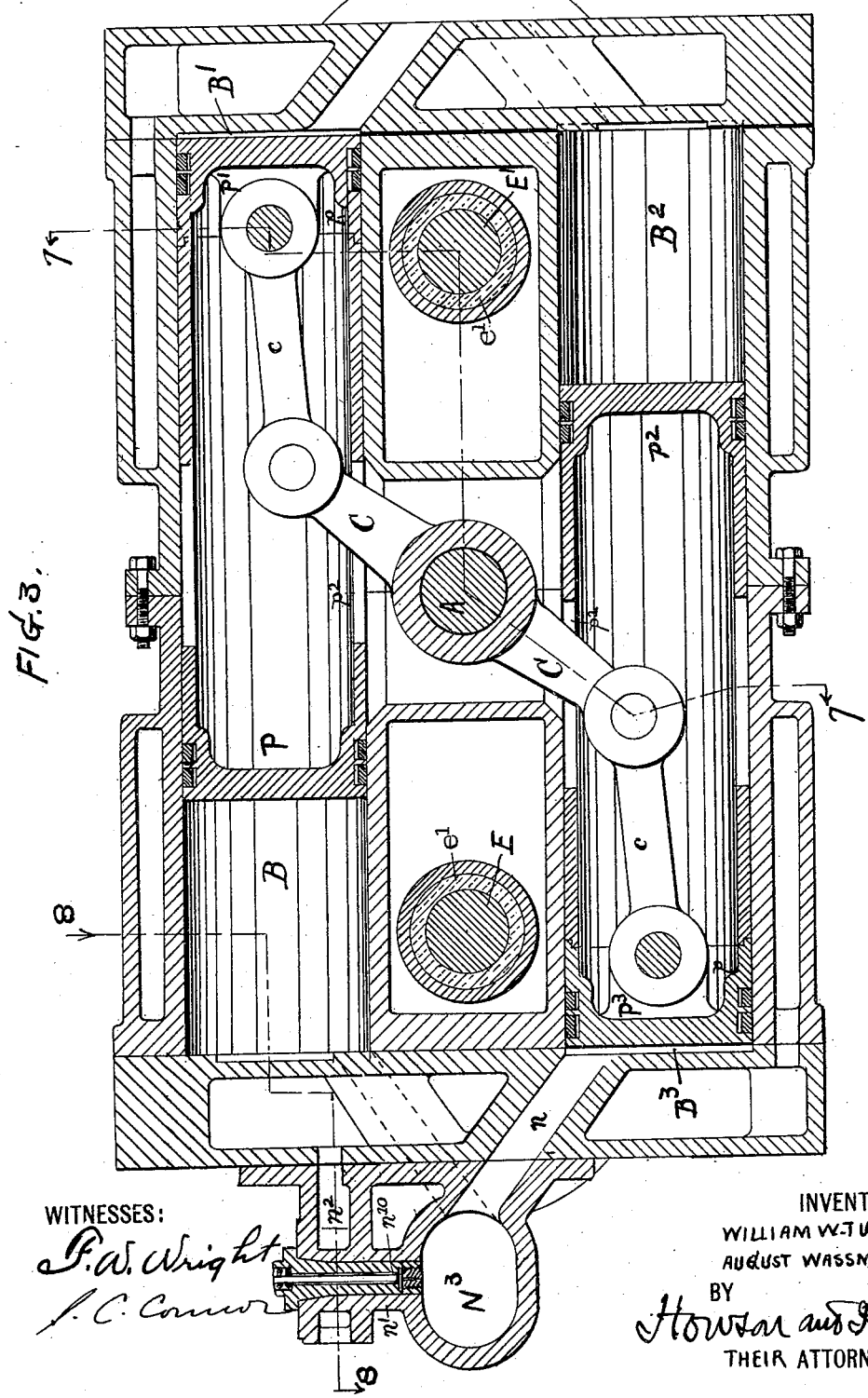
WITNESSES:
F. W. Wright
J. C. Connor
INVENTORS
WILLIAM W. TUCK
AUGUST WASSMANN
BY
Howson and Howson
THEIR ATTORNEYS.

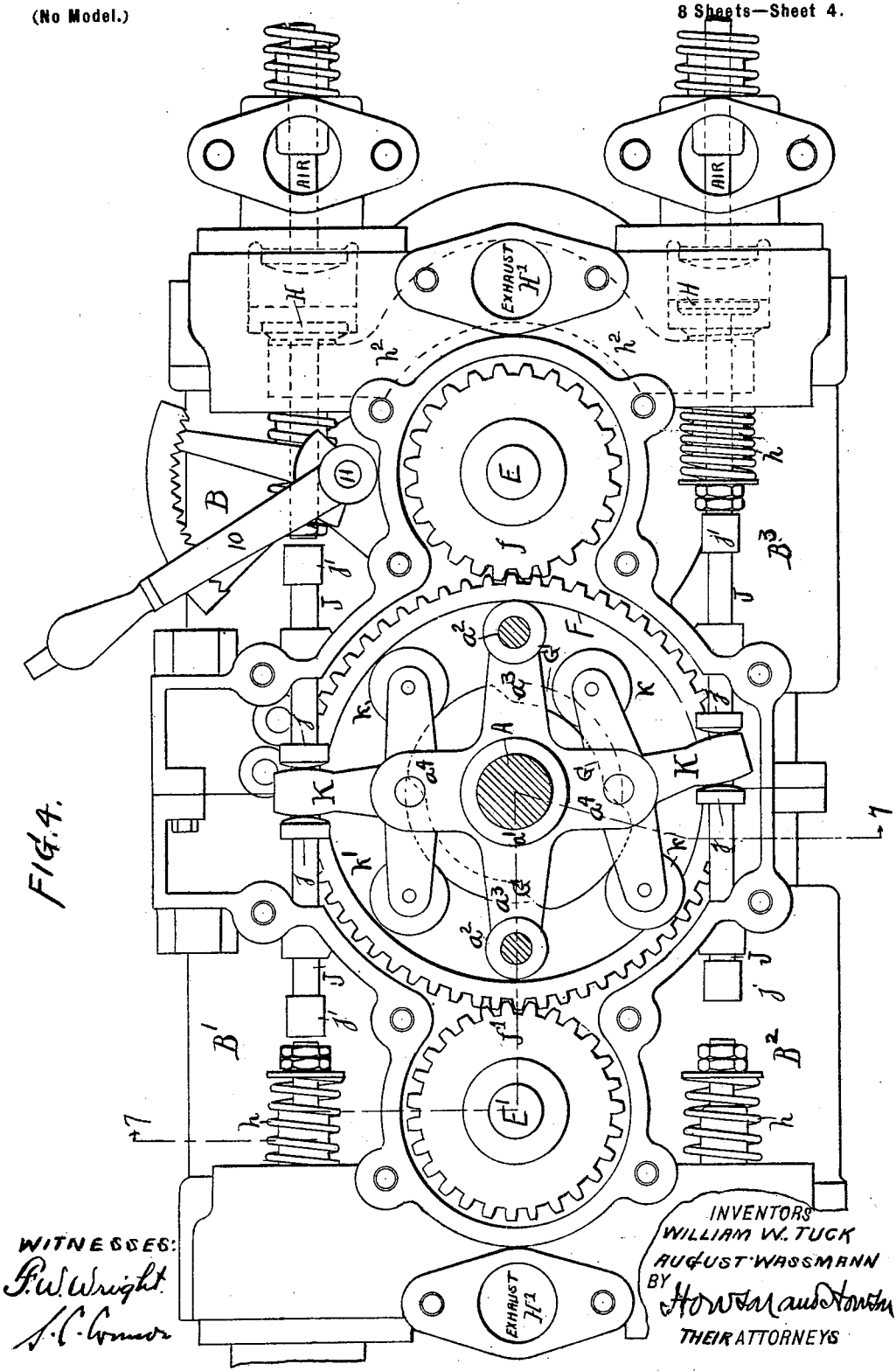

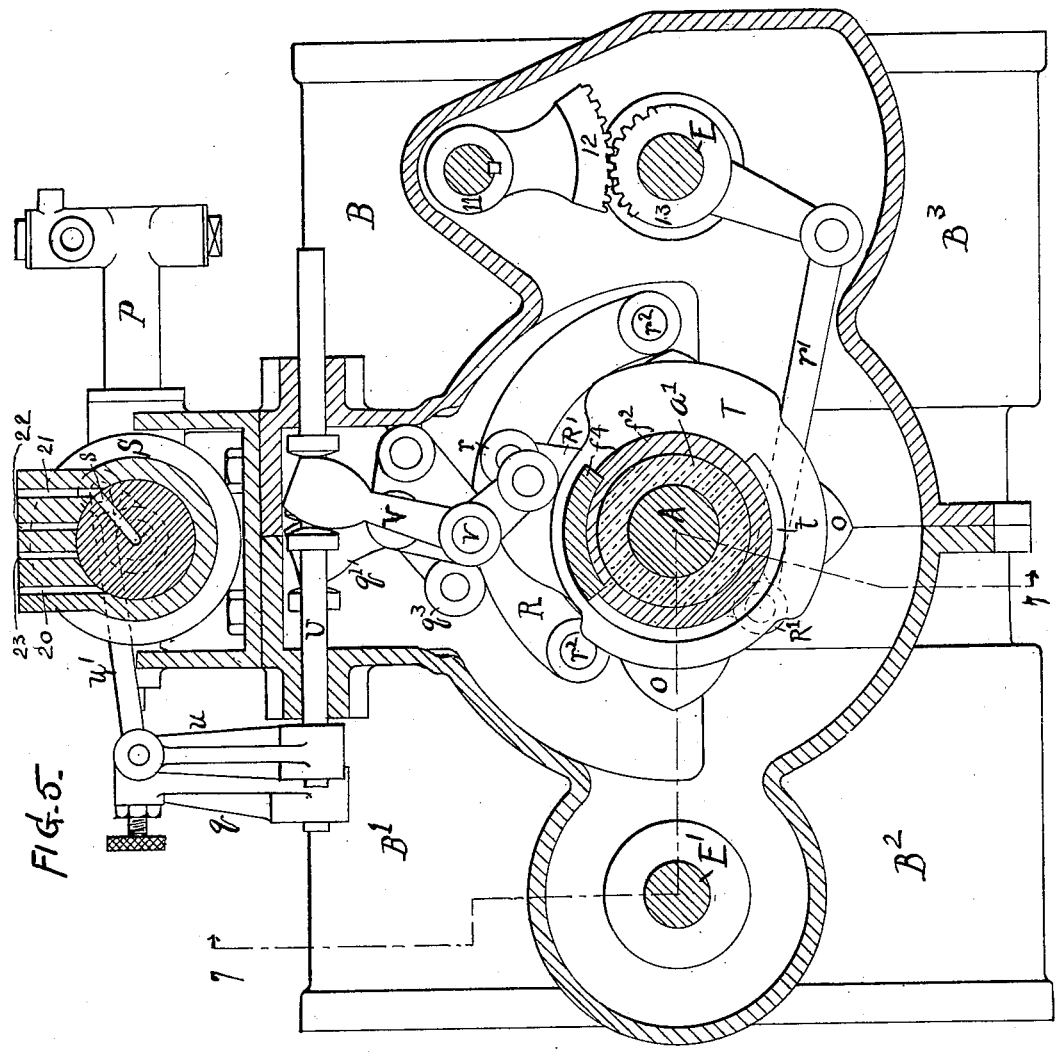

No. 682,003. Patented Sept. 3, 1901.
W. W. TUCK & A. WASSMANN.
EXPLOSION ENGINE.
(Application filed Mar. 5, 1901.)
(No Model.) 8 Sheets—Sheet 6.
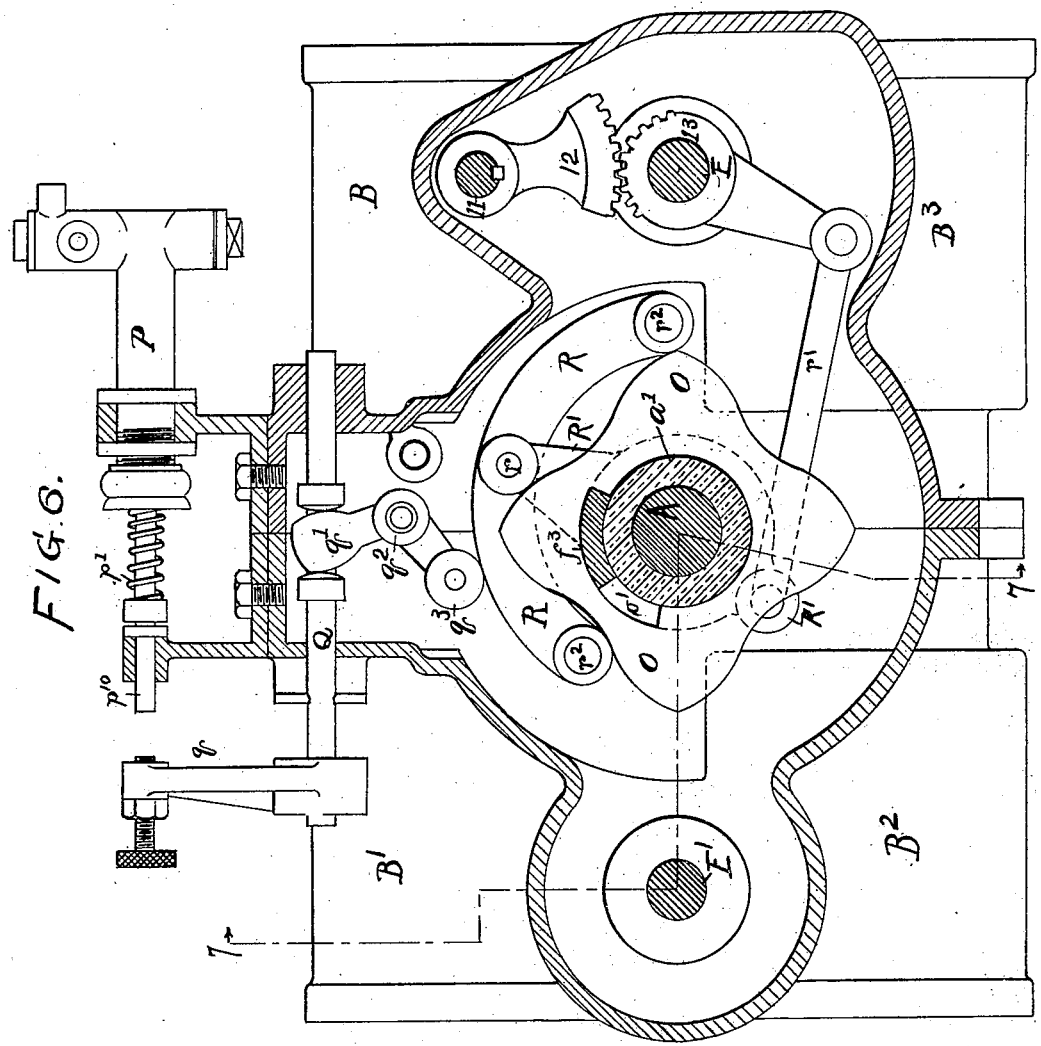
WITNESSES
F. W. Wright
J. C. Connor
INVENTORS
WILLIAM W. TUCK
AUGUST WASSMANN
BY
Howson and Howson
THEIR ATTORNEYS.

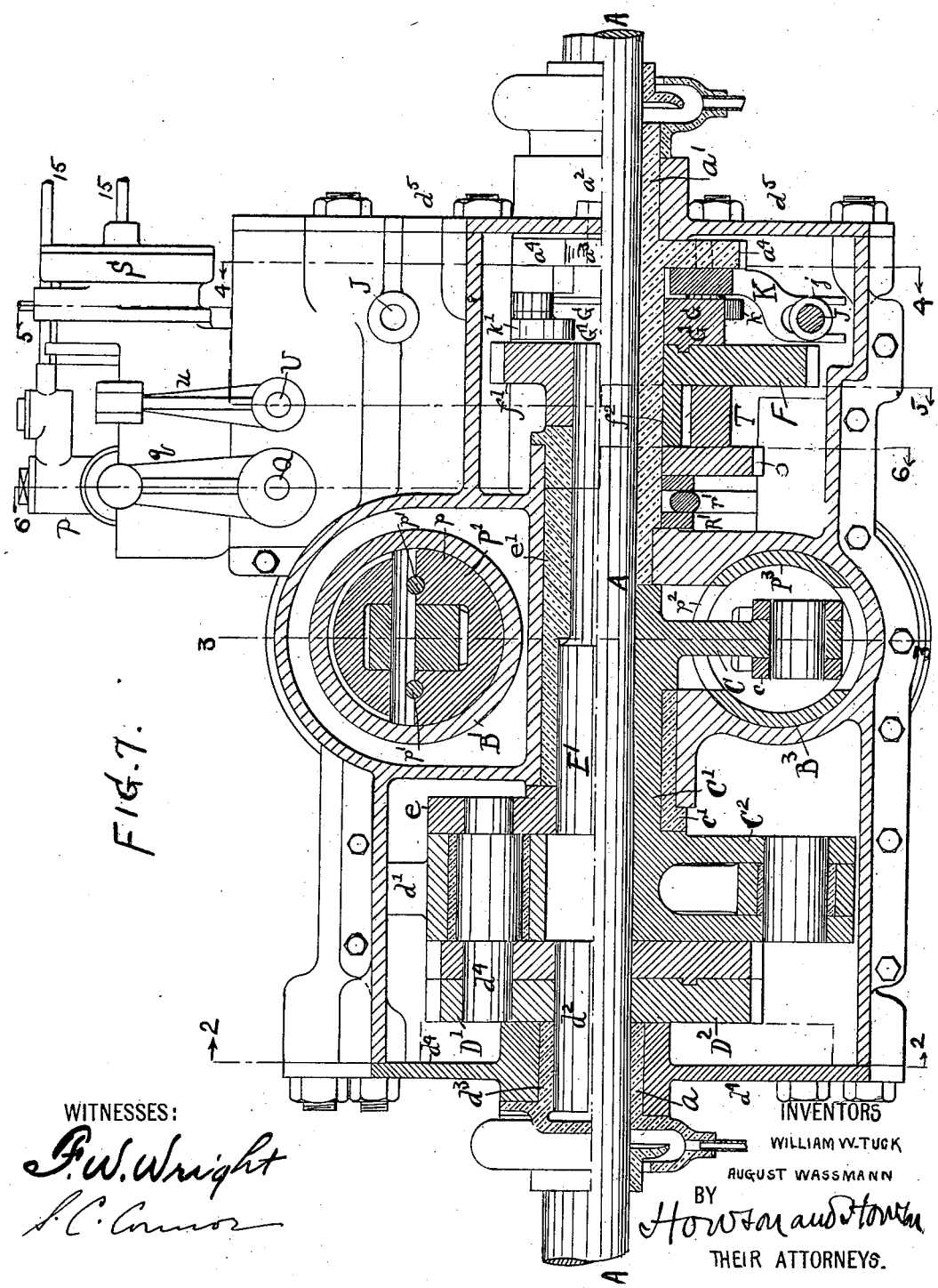

No. 682,003. Patented Sept. 3, 1901.
W. W. TUCK & A. WASSMANN.
EXPLOSION ENGINE.
(Application filed Mar. 5, 1901.)
(No Model.) 8 Sheets—Sheet 8.
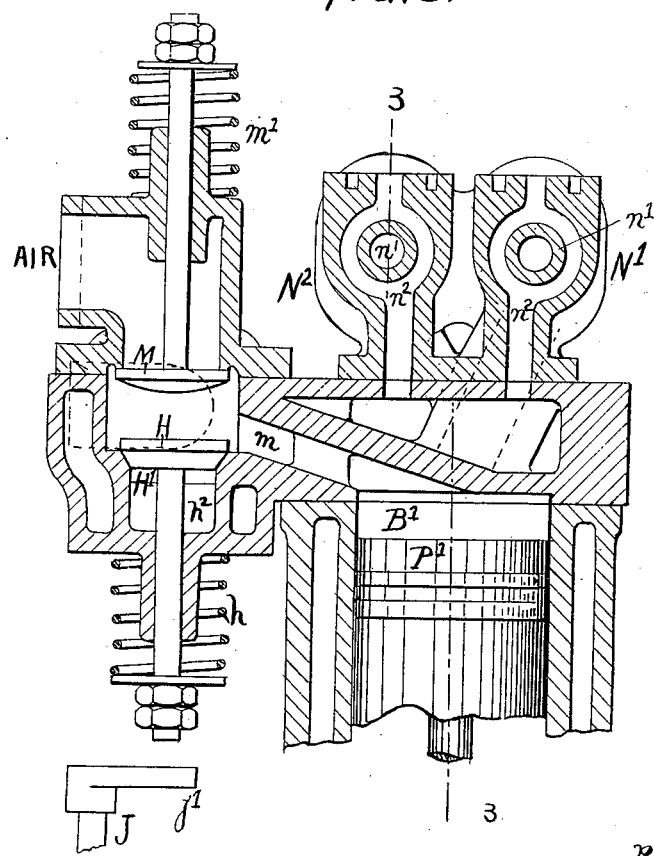
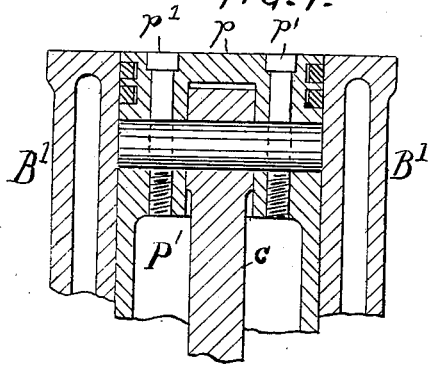
WITNESSES:
F. W. Wright
L. C. Connor
INVENTORS
WILLIAM W. TUCK
AUGUST WASSMANN
BY
Howson and Howson
THEIR ATTORNEYS

UNITED STATES PATENT OFFICE.

WILLIAM W. TUCK, OF BROOKLYN, AND AUGUST WASSMANN, OF ASTORIA, NEW YORK, ASSIGNORS TO ABBOT A. LOW, OF BROOKLYN, NEW YORK.

EXPLOSION-ENGINE.

SPECIFICATION forming part of Letters Patent No. 682,003, dated September 3, 1901.

Application filed March 5, 1901. Serial No. 49,875. (No model.)

*To all whom it may concern:*

Be it known that we, WILLIAM W. TUCK, a resident of the borough of Brooklyn, county of Kings, and AUGUST WASSMANN, a resident of Astoria, in the borough and county of Queens, State of New York, citizens of the United States of America, have invented Improvements in Explosion-Engines, of which the following is a specification.

The object of our invention is to construct an efficient and well-balanced and compact engine operated by the explosion of combustible mixtures.

In the present instance we have shown our improvements as embodied in a four-cycle engine in which the explosive mixture is obtained by vaporizing oil and mixing it with air; but it should be understood at the outset that our improvements are applicable to other types of explosion-engines and to the employment of other materials for the explosive mixtures.

In the accompanying drawings, Figure 1 is a plan view of our engine. Fig. 2 is a sectional view on the line 2 2, Fig. 1. Fig. 3 is a sectional view on the line 3 3, Figs. 1, 7, and 8. Fig. 4 is a sectional view on the line 4 4, Figs. 1 and 7. Fig. 5 is a sectional view on the line 5 5, Figs. 1 and 7. Fig. 6 is a sectional view on the line 6 6, Fig. 7. Fig. 7 is a sectional view on the irregular line 7 7, Figs. 2, 3, 4, 5, and 6, the upper portion being a section on the line of upper counter-shaft, while the lower part is on the line of the main shaft. Fig. 8 is a sectional view on the line 8 8, Fig. 3. Fig. 9 is a sectional view through one of the pistons and cylinders at right angles to the section Fig. 3.

Although in the drawings we have shown our engine as arranged in a horizontal position—that is, with the cylinders in horizontal planes—it will be evident that it may be arranged to stand in any other suitable position.

Our engine is a four-cylinder engine with the cylinders oppositely placed and with the main shaft midway between the cylinders, but at right angles thereto.

A is the main shaft to which the power is to be applied, and, as shown in Fig. 1, this shaft may have one or more fly-wheels $A'$ $A'$. The shaft turns in suitable bearings $a$ and $a'$ in the frame, as shown at the lower part of Fig. 7. The four cylinders B, $B'$, $B^2$, and $B^3$ are shown in Fig. 3 as being made in two castings bolted together and are water-jacketed, as usual. In these cylinders work the four pistons P, $P'$, $P^2$, and $P^3$, which are made in pairs, the two pistons P and $P'$ being formed on one trunk and the two pistons $P^2$ and $P^3$ on another trunk. Each of these duplex-piston trunks has one end $p$ formed as a detachable head or cap, Figs. 3 and 9, which may be secured in place by bolts $p'$, Figs. 7 and 9. In the sides of these duplex-piston trunks are formed slots $p^2$, through which project the ends of a rocking lever C into the trunks. This rocking lever C turns freely about but free of the main shaft A, its sleeve $C'$, Fig. 7, turning in a bearing $c'$ in the frame. The lever is connected at one end to one trunk and at the other end to the other trunk by the connecting-rods $c$, Fig. 3. Motion is communicated from the rocking lever C to the main shaft A and converted from a rocking motion into a rotary motion by means of the gearing illustrated in Figs. 2 and 7. As shown at the lower half of Fig. 7, the rocking lever C forms part of or is connected to a sleeve $C'$, turning in the bearing $c'$ in the frame of the engine, and to the other end of this sleeve is secured a rocking lever $C^2$ at the sides of the cylinders, Figs. 7 and 2. This second rocking lever $C^2$ is connected by connecting-rods $d$ $d'$, Fig. 2, to crank-pins $d^4$, extending on one side into the gear-wheels D and $D'$ and on the other side into crank-disks $e$, (upper part of Fig. 7,) which are keyed to the counter-shafts E $E'$, Fig. 3. The gear-wheels D and $D'$ are keyed to short shafts $d^2$ $d^2$, Fig. 2, turning in bearings $d^3$ in the frame, (in this instance the end plate $d^4$, Fig. 7.) The counter-shafts E $E'$, which carry the crank-disks $e$ $e$, turn in bearings $e'$ $e'$ between the main cylinders, as seen at the upper part of Fig. 7 and in Fig. 3. The two gear-wheels D $D'$ gear into an intermediate gear-wheel $D^2$, keyed to the main shaft A, as seen in Fig. 2, and thereby the rocking movements of the levers C and $C^2$ will, through the rods $d$ $d'$, impart complete revolutions to the gear D $D'$, and thence to the gear-wheels $D^2$ and the main shaft A, as will be understood. The shafts E and E', which, as described, pass through between the main cylinders, Figs. 3 and 7, have keyed to their ends opposite from the gearing last described pinions $f f'$, which, as shown in Fig. 4, gear into an intermediate gear-wheel F of twice the diameter and impart rotary motion to it. This wheel F turns freely upon the fixed bearing-sleeve $a'$, Fig. 7, and has secured to it a duplex cam G G', which controls the opening of the several exhaust-valves H. (Indicated by dotted lines at the right of Fig. 4 and by full lines in Fig. 8.)

The bearing-sleeve $a'$ is fixed to the frame by means of pins $a^2$, Fig. 4, on arms $a^3$ of the sleeve fixed in holes in the frame—in this case the end plate $d^5$, Fig. 7. To arms $a^4$ on this same sleeve $a'$ are pivoted the three-armed tappet-levers K, each of which carries two antifriction-rollers $k$ and $k'$, one running on the cam G and the other on the cam G', Fig. 7. The third arm of each tappet-lever is bifurcated, as seen at the lower right hand of Fig. 7, and acts upon the shoulders $j$ of a sliding rod J, adapted to move in guides in the frame or inclosing casing, Fig. 4. The opposite ends of these rods J are provided with tappets $j'$, Fig. 8, to act upon the stems of the exhaust-valves H to open the latter against the closing action of their spiral springs $h$. The cams G G' are so constructed that their depressions and rises act together upon the rollers $k k'$ to tilt the tappet-levers K K in one direction to open one of the exhaust-valves and in the other direction to open the other of the two exhaust-valves controlled by them and also to hold the tappet-levers in the midway position to act on neither valve. The gear-wheel F makes but one revolution for every two revolutions of the shaft A, or, in other words, makes but one revolution for the complete set of four cycles, and therefore the cams G G' are quartered to open the four exhaust-valves in succession, one at a time.

The passage $m$ from the cylinder to the exhaust-valve H is shown in Fig. 8 and is also utilized for the admission of air drawn in by the return movement of the piston, the air and inlet-valve M being drawn open by the suction against the closing action of its spring $m'$. The exhausted products of combustion pass out beyond the valves H to and through passages $h^2$, Figs. 4 and 8, to outlets H' H', each one of two such outlets being common to the two adjacent exhaust-valves, Fig. 4.

As we have before explained, the engine shown in the drawings is adapted to be operated through the agency of vaporized oil. We prefer to use the duplex ignition-bulb of J. W. Eaton's patent, No. 669,514, dated March 12, 1901, for the pairs of cylinders at opposite sides of the main shaft. These ignition-bulbs N N' N² N³ are arranged in pairs at the ends of the pairs of cylinders, as shown in Figs. 1, 3, and 8, and each bulb communicates through a passage $n$, Fig. 3, with the corresponding cylinder B, B', B², or B³. The oil-spray is injected into the red-hot bulb through the nozzle $n^{10}$ at the proper moment when the compression of the air charge by the outward stroke of the engine is about completed and the ignition of the explosive mixture takes place in the manner common in this class of engines. The neck $n'$ of each bulb through which the oil-nozzle enters is water-jacketed, as at $n^2$, Figs. 3 and 8. The pipes for the water-outlets of these bulb-jackets and the cylinder-jackets are represented at $w$ and $w'$, Fig. 1.

We will now describe the means for supplying the oil to the several ignition-bulbs N, N', N², and N³. We utilize this means to make the engine reversible. Referring particularly to Figs. 5 and 6, P is an oil-pump, the piston-rod $p^{10}$ of which is acted on in one direction by a spring $p'$ and in the other direction (the forcing stroke) by a tappet $q$ on a sliding rod Q. This rod is actuated by an elbow-lever $q'$, pivoted at $q^2$ to the frame and having an antifriction-roller $q^3$ bearing against a rocking lever R. This latter is pivoted at $r$ to a ring R' on the bearing-sleeve $a'$, Figs. 6 and 7, and has at its opposite ends antifriction-rollers $r^2$ to bear against different parts of the four-point cam O, which by its rotation thus imparts a rocking movement to the lever R on its pivot $r$, and through the bell-crank lever $q'$, rod Q, and its tappet $q$ gives four forcing strokes to the piston of the pump for each revolution. The point at which the bell-crank lever $q'$ bears against the rocking lever R can be changed by turning the ring R' upon the sleeve $a'$, and this can be accomplished by the hand-lever 10, Figs. 1 and 4, on the spindle 11, which carries a quadrant 12, Figs. 5 and 6, gearing into a quadrant 13, free to turn on the shaft E. The arm of this quadrant 13 is connected by the rod $r'$ to the ring R'. By this means the pump-stroke may be varied in length and time, for by shifting the rocking lever, so as to bring the roller $q^3$ of the lever $q'$ to one side or the other of the pivoting-point $r$, the time of forcing the oil-jet into the ignition-bulb may be so changed or, in fact, reversed as to produce a reversal of the engine while in operation. Rotary motion is imparted to the cam O from the gear-wheel F, Figs. 4 and 7, through a sleeve $f^2$, Figs. 5 and 7, on the said wheel. This sleeve has an extension $f^3$, which lies in a curved slot $o'$, Fig. 6, in the cam O. This slot $o'$ is made considerably longer than the extension $f^3$ in order to allow lost motion on reversing and so give the proper timing to the pump when the direction of rotation has thus been reversed.

The pump may receive its oil-supply from a suitable reservoir, and in order that the one pump may serve for all four ignition-bulbs in proper order we introduce in the distributing-piping a distributing-valve S, Figs. 1 and 5. The oil from the pump passes through a pipe 15, Fig. 1, to the center of the valve-chamber and valve S, Fig. 5, which is shown as a rotary oscillating valve with a radial discharge s leading to any one of four conduits or pipes 20, 21, 22, and 23, which are in communication, Fig. 1 with the ignition-bulbs N, N', N², and N³, respectively. To move the valve S intermittently to the different positions, we employ the four-stepped cam T, (shown in Fig. 5,) mounted on the sleeve $f^2$ of the gear-wheel F, Fig. 7. A wide key $f^4$ on this sleeve engages in a long curved slot $t$ in the cam T, so as to allow sufficient lost motion on the reversal to give the proper timing to the cam when the engine is to run in the reverse direction. This cam T acts upon the valve S through a bell-crank lever V, pivoted at $v$ to the frame, and acting upon a slide-rod U, which carries an arm $u$, connected by a rod $u'$ to a crank-arm on the stem of the valve S, Fig. 5. It will be understood that the pump-actuating mechanism must give the forcing movement to the pump at the time the valve S brings its discharge opposite each conduit or oil-pipe 20, 21, 22, or 23.

From the foregoing detailed description it will be seen that we secure not only a good balance but also great compactness, and this latter by avoiding the use of cranks between the opposite cylinders. This we are enabled to do by the use of the rocking lever between the cylinders and gearing at the side of the latter connecting the rocking lever to the main shaft. The carrying of the counter-shafts E E' through to the opposite side of the cylinders and providing there the gearing for operating the valves and pump adds to the balance. This compactness and balance are both valuable features, especially for boats and vehicles.

We claim as our invention—

1. An engine having oppositely-placed cylinders and pistons and a main shaft passing between the cylinders at right angles thereto, in combination with a rocking lever between the cylinders and connected to the pistons and crank connections at the sides of the cylinders, by which the rocking lever is connected up with the main shaft, substantially as described.

2. An engine having oppositely-placed cylinders and pistons and a main shaft passing between the cylinders at right angles thereto, in combination with a rocking lever mounted to turn freely about the shaft and connected to the pistons, and crank connections at the sides of the pistons between the rocking lever and shaft, substantially as described.

3. An engine having oppositely-placed cylinders and pistons and a main shaft passing between the cylinders at right angles thereto in combination with a rocking lever between the cylinders and connected to the pistons and cranks and gear-wheels at the sides of the cylinders connecting the rocking lever to the shaft, substantially as described.

4. An engine having oppositely-placed cylinders and pistons and a main shaft between the cylinders, in combination with a rocking lever mounted to turn freely on the main shaft and connected to the pistons, a second rocking lever at the side of the cylinders, connected to the first lever, two gear-wheels having crank-pins connected to said second rocking lever and a wheel keyed on the main shaft and geared to said two gear-wheels, substantially as described.

5. An explosive-engine having oppositely-placed cylinders and pistons and valves and a main shaft passing between the cylinders at right angles thereto, in combination with a rocking lever between the cylinders and at one side of the cylinders, crank connections between the lever and the shaft, while at the other side of the cylinders, is the valve-operating mechanism, substantially as described.

6. An explosive-engine having oppositely-placed cylinders and pistons, oil-bulbs and an air inlet and exhaust valves, with a main shaft and a rocking lever between the cylinders and connected to the pistons, gearing on one side of the cylinders connecting the lever with the shaft, while on the other side of the cylinders is the mechanism for operating the exhaust-valves and the oil-supply, all substantially as described.

7. An engine having four oppositely-placed cylinders and pistons and valves and a main shaft passing between the cylinders at right angles thereto, in combination with a rocking lever between the cylinders and connected to the pistons, gearing on one side of the cylinders, counter-shafts passing between adjacent cylinders parallel with the main shaft and connected to the rocking lever by said gearing, with valve-operating devices actuated from said counter-shafts, all substantially as described.

8. An engine having oppositely-placed cylinders and pistons and valves, in combination with a main shaft passing between the cylinders, crank connections on one side of the cylinders between the pistons and shaft and on the other side of the cylinders the valve-actuating mechanism, substantially as described.

9. A multiple-cylinder oil-engine, having an ignition-bulb for each cylinder, in combination with an oil-pump, distributing-piping from the pump to the bulbs and a distributing-valve in the piping to supply oil to one bulb at a time, substantially as described.

10. A multiple-cylinder oil-engine having an ignition-bulb for each cylinder, in combination with an oil-pump, a distributing-valve and pipes leading from said valve, one to each bulb and means for automatically operating said valve from a moving part of the engine to connect the several pipes in succession and one at a time with the pump, substantially as described.

11. A multiple-cylinder oil-engine having an ignition-bulb for each cylinder, in combination with an oil-pump, a distributing-valve and pipes leading from said valve, one to each bulb, means for automatically operating said valve from a moving part of the engine to connect the several pipes in succession one at a time with the pump and means for simultaneously actuating the pump, substantially as described.

12. An explosive oil-engine having an oil-pump, a cam, means for actuating the pump from a moving part of the engine and means for changing the time of actuation of the pump to reverse the engine while in operation.

13. A multiple-cylinder oil-engine having an ignition-bulb for each cylinder, in combination with an oil-pump, means for supplying oil to the several bulbs from the pump, a cam, a rocking lever actuated by the cam, lever-and-rod connections to the pump and means for changing the relation of the rocking lever to the cam and said lever connections to change the time of actuating the pump, substantially as described.

In testimony whereof we have signed our names to this specification in the presence of two subscribing witnesses.

WILLIAM W. TUCK.
AUGUST WASSMANN.

Witnesses:
M. A. WARREN,
JAMES W. EATON.